(12) United States Patent
Gotoh et al.

(10) Patent No.: US 7,979,165 B2
(45) Date of Patent: Jul. 12, 2011

(54) MASS FLOW RATE CONTROL APPARATUS, ITS CALIBRATION METHOD AND SEMICONDUCTOR-PRODUCING APPARATUS

(75) Inventors: Takao Gotoh, Mie-ken (JP); Akifumi Hayashi, Kuwana (JP); Tohru Matsuoka, Mie-ken (JP); Shigehiro Suzuki, Kuwana (JP); Yoshiyuki Furukawa, Kaizu (JP); Makoto Tanaka, Yokkaichi (JP)

(73) Assignee: Hitachi Metals, Ltd., Tokyo (JP)

( * ) Notice: Subject to any disclaimer, the term of this patent is extended or adjusted under 35 U.S.C. 154(b) by 1146 days.

(21) Appl. No.: 11/688,345

(22) Filed: Mar. 20, 2007

(65) Prior Publication Data

US 2007/0233412 A1 Oct. 4, 2007

(30) Foreign Application Priority Data

Mar. 20, 2006 (JP) ................................. 2006-076980
Dec. 15, 2006 (JP) ................................. 2006-337917

(51) Int. Cl.
*G05D 7/06* (2006.01)
*G01F 1/66* (2006.01)

(52) U.S. Cl. ............... 700/282; 137/2; 137/486; 702/45

(58) Field of Classification Search .................. 700/282; 702/45; 137/2, 486, 487.5; 73/1.16, 23.2, 73/1.35
See application file for complete search history.

(56) References Cited

U.S. PATENT DOCUMENTS

| 5,744,695 A * | 4/1998 | Forbes | 73/1.35 |
| 5,865,205 A | 2/1999 | Wilmer | |
| 6,363,958 B1 | 4/2002 | Ollivier | |
| 6,450,200 B1 | 9/2002 | Ollivier | |
| 6,655,408 B2 * | 12/2003 | Linthorst | 137/487.5 |
| 6,832,628 B2 * | 12/2004 | Thordarson et al. | 137/613 |
| 6,948,508 B2 * | 9/2005 | Shajii et al. | 137/1 |
| 7,216,019 B2 * | 5/2007 | Tinsley et al. | 700/282 |
| 7,273,063 B2 * | 9/2007 | Lull et al. | 137/12 |
| 7,360,551 B2 * | 4/2008 | Lull et al. | 137/9 |
| 7,380,564 B2 * | 6/2008 | Lull et al. | 137/1 |

FOREIGN PATENT DOCUMENTS

| JP | 11-045122 | 2/1999 |
| JP | 11-223538 | 8/1999 |
| JP | 2006-038832 | 2/2006 |

* cited by examiner

*Primary Examiner* — Ramesh B Patel
*Assistant Examiner* — Douglas S Lee
(74) *Attorney, Agent, or Firm* — Sughrue Mion, PLLC

(57) ABSTRACT

A method for calibrating a mass flow controller comprising a calibrating valve disposed on the most upstream side of a path, a mass flow rate control valve mechanism, a tank provided at the path on the upstream side of the mass flow rate control valve mechanism, a mass-flow-rate-sensing means, a pressure-sensing means, a means for controlling the mass flow rate control valve mechanism, and a mass flow rate calibration control means, the method comprising the steps of (1) permitting a fluid at a set mass flow rate to flow through the path, (2) setting the mass flow rate control valve mechanism at a degree of opening that the mass flow rate of the fluid is equal to the set mass flow rate, (3) closing the calibrating valve, (4) measuring the pressure and mass flow rate of the fluid after a fluid flow from the tank is stabilized, (5) determining a variation ratio of the pressure and mass flow rate to reference pressure and mass flow rate measured by the same procedures in an initial state, and (6) performing calibration depending on the variation ratio.

11 Claims, 11 Drawing Sheets

Fig. 6  Calibration Routine in First Method

Calibration Routine in Second Method

MASS FLOW RATE CONTROL APPARATUS, ITS CALIBRATION METHOD AND SEMICONDUCTOR-PRODUCING APPARATUS

FIELD OF THE INVENTION

The present invention relates to a mass flow controller capable of calibrating the accuracy of the mass flow rate control of a fluid at a relatively small flow rate, a method for calibrating such a mass flow controller, and a semiconductor-producing apparatus comprising such a mass flow controller.

BACKGROUND OF THE INVENTION

In general, when CVD, etching, etc. are conducted on semiconductor wafers in the production of semiconductors such as semiconductor integrated circuits, etc., mass flow controllers are used to control the amount of a treating gas supplied at high accuracy.

FIG. 13 shows a conventional mass flow controller 2 disposed in the course of a path (for instance, gas pipe) 4 for flowing a fluid such as liquid, gas, etc. The mass flow controller 2 comprises a path 6 made of stainless steel, etc. with both ends connected to a gas pipe 4, a mass-flow-rate-sensing means 8 positioned on the upstream side of the path 6, a mass flow rate control valve mechanism 10 positioned on the downstream side of the path 6, and a mass-flow-controlling means 18 such as a micro-computer.

The mass-flow-rate-sensing means 8 comprises pluralities of bypass pipes 12, and a sensor pipe 14 having openings near both ends of the bypass pipes 12 to bypass the bypass pipes 12 for always flowing part of a gas at a predetermined ratio. A pair of series-connected resistors R1, R4 made of a material having resistivity changeable with temperature are wound around the sensor pipe 14. The resistor R1 is positioned on the upstream side of a gas flow, while the resistor R4 is on the downstream side. A sensor circuit 16 connected to the resistors R1, R4 outputs a mass flow rate signal Sg1.

The mass-flow-controlling means 18 calculates the mass flow rate of the gas according to the mass flow rate signal Sg1 output from the sensor circuit 16, to control the mass flow rate control valve mechanism 10 such that the mass flow rate is equal to a set mass flow rate indicated by a signal Sg0 input from outside.

The mass flow rate control valve mechanism 10 comprises a mass flow rate control valve 20 disposed on the downstream side of the path 6, and a circuit 28 for driving the mass flow rate control valve 20. The mass flow rate control valve 20 comprises a valve opening 24 disposed in the path 6, a metal diaphragm 22 for controlling the opening degree of the valve opening 24, an actuator 26 constituted by a laminated piezoelectric element fixed to an upper surface of the diaphragm 22, and a case 27 receiving the diaphragm 22 and the actuator 26. The valve-driving circuit 28 receives a driving signal from the mass-flow-controlling means 18 to output a valve-driving signal (voltage) S2 to the actuator 26, which deforms the diaphragm 22 to control the opening degree of the valve opening 24.

FIG. 14 shows the mass-flow-rate-sensing means 8. The sensor circuit 16 comprises two reference resistors R2, R3 parallel-connected to the resistors R1, R4, such that the series-connected resistors R1, R4 and the series-connected reference resistors R2, R3 constitute a bridge circuit. The reference resistors R2, R3 are kept at a constant temperature. The resistors R1, R4 function as a heater, too. This bridge circuit comprises a constant-current source 30 parallel-connected to the reference resistors R2, R3, and a differential circuit 32 whose inputs are connected to a connecting point of the resistors R1, R4 and a connecting point of the reference resistors R2, R3. The differential circuit 32 determines a mass flow rate from a potential difference between both connecting points, to output a mass flow rate signal Sg1.

When there is no gas flow passing through the sensor pipe 14, both resistors R1, R4 are at the same temperature, resulting in the bridge circuit in equilibrium, so that no potential difference is sensed by the differential circuit 32. When the gas flows at a mass flow rate Q through the sensor pipe 14, the gas is heated by the resistor R1 on the upstream side and flows to the resistor R4 on the downstream side, resulting in the movement of heat to generate temperature difference between the resistors R1, R4. As a result, the difference of resistivity is generated between both resistors R1, R4, so that potential difference proportional to the mass flow rate of the gas is sensed by the differential circuit 32. Accordingly, the mass flow rate signal Sg1 output from the differential circuit 32 is proportional to the mass flow rate of the gas. The degree of opening the mass flow rate control valve 20 is controlled by, for instance, a proportional-integral-derivative (PID) control method, such that the sensed mass flow rate of the gas is equal to a set mass flow rate (voltage signal Sg0).

In the mass flow controller 2 shown in FIG. 13, it is necessary that the flow rate of a gas actually passing through the mass flow rate control valve 20 is equal to the set mass flow rate represented by the signal Sg0 at high accuracy. However, variation with time, such as the attachment of foreign matter to an inner wall of the sensor pipe 14, etc., makes the flow rate of a gas actually passing through the mass flow rate control valve 20 slightly different from the time of installation even if the same valve-driving voltage S2 is applied.

FIG. 15 shows the mass flow controller 101 disclosed by JP8-335117A. This mass flow controller 101 comprises a pipe 111 disposed between an upstream-side pipe 103 connected to a fluid supply source 102 and a downstream-side pipe 105 connected to a vacuum pump 104; a variable valve 112, a pressure sensor 114, a temperature sensor 115, an ultrasonic nozzle 113 and a pressure sensor 116 mounted to the pipe 111 in this order from the upstream side; a control circuit 120 receiving the outputs of the pressure sensor 114, the temperature sensor 115 and the pressure sensor 116 via A/D converters; and a driver 121 receiving the output signal of the control circuit 120 to output a driving signal to the variable valve 112. With the pressure of a fluid on the upstream and downstream sides of the ultrasonic nozzle 113 set such that its Reynolds number at the ultrasonic nozzle 113 is 106 or more, the fluid can be supplied at a target mass flow rate without being affected by the pressure and temperature of the fluid on the downstream side. However, in even this mass flow controller 101, variation with time, such as the attachment of foreign matter to the ultrasonic nozzle 113, the inner surface wear of the nozzle, the drift of the pressure sensor 114 and the temperature sensor 115, etc. makes the actual flow rate of a gas slightly different from the time of installation, even if the same valve-driving voltage is applied.

U.S. Pat. No. 5,865,205 discloses a method for controlling a gas flow out of a reservoir of a known volume, comprising the steps of (a) providing a desired flow input signal and a calibration signal to a first circuit and producing a calibrated flow input signal; (b) providing the calibrated flow input signal to a flow control circuit, the flow control circuit producing a control signal to a flow control valve located in a gas flow path downstream of the reservoir to control the gas flow; (c) releasing a gas from the reservoir by opening a reservoir outlet isolation valve; (d) sensing the gas flow in the gas flow path at a location downstream of the flow control valve and providing a measured flow signal indicative thereof to the first flow control circuit; (e) calculating a desired mass of gas to be released from the reservoir by integrating the desired flow input signal over a period of time in which the reservoir outlet isolation valve is open and producing a first signal indicative thereof, (f) calculating an actual mass of gas released from the reservoir by comparing a first mass of gas residing in the reservoir at a first time prior to opening the outlet isolation valve, to a second mass of the gas residing in the reservoir at a second time after the output isolation valve is closed, and producing a second signal indicative thereof, and (g) comparing the first and second signals to produce an updated calibration signal. However, because this method uses the reservoir outlet isolation valve between the reservoir and the mass flow rate control valve, and a pressure-sensing means and an orifice between the mass flow rate control valve and the isolation valve, the overall structure of the apparatus is complicated, and the reservoir should have a large volume. Further, because the first and second signals each indicating a mass determined from the sensed pressure are compared, the mass signal is subjected to the same degree of variation with time (drift phenomenon and the change of a Cv value), resulting in errors easily occurring in the calibration results.

JP2006-38832A discloses a mass flow controller comprising a small tank for performing mass flow rate calibration by comparing pressure variation at calibration with a reference pressure variation. However, because a mass flow rate signal output from a mass-flow-rate-sensing means expected to undergo variation with time does not affect the calibration result, the calibration of the mass flow rate control does not necessarily have sufficient accuracy. Although it is assumed in this calibration method that a tank volume is constant, the tank volume actually changes for reasons such as the attachment of products to an inner wall of the tank, etc. Accordingly, the calibration result by this method suffers from errors by the variation of the tank volume.

OBJECTS OF THE INVENTION

Accordingly, an object of the present invention is to provide a mass flow controller capable of performing calibration at high accuracy, taking into consideration both pressure and mass flow rate as well as the variation of a tank volume.

Another object of the present invention is to provide a method for calibrating such a mass flow controller.

A further object of the present invention is to provide a semiconductor-producing apparatus comprising such a mass flow controller.

DISCLOSURE OF THE INVENTION

A mass flow controller having a path for flowing a fluid, comprising
a calibrating valve disposed on the most upstream side of the path for opening or closing the path;
a mass flow rate control valve mechanism having such a changeable degree of opening that the mass flow rate of the fluid is equal to a set mass flow rate;
a tank provided at the path upstream of the mass flow rate control valve mechanism;
a means for sensing the mass flow rate of the fluid to output a mass flow rate signal;
a means for sensing the pressure of the fluid to output a pressure signal; and
a calibration control means for carrying out mass flow rate calibration using the calibrating valve, the tank, the mass-flow-rate-sensing means and the pressure-sensing means.

The calibration control means preferably comprises a reference data memory for memorizing the pressure and mass flow rate of the fluid in an initial state as a reference pressure and a reference mass flow rate, and a calibrating data memory for memorizing the pressure and mass flow rate of the fluid after the lapse of time as a calibrating pressure and a calibrating mass flow rate.

It is preferable that a ratio of the product of a decrement of the reference pressure and a volume of the tank to an integral value of the reference mass flow rate or a difference therebetween is defined as a reference comparator Ai, that a ratio of the product of a decrement of the calibrating pressure and the tank volume to an integral value of the calibrating mass flow rate or a difference therebetween is defined as a calibrating comparator Af, and that a variation ratio H of Af to Ai is compared with a predetermined value for calibration.

A temperature sensor is preferably mounted to the tank to measure a temperature in the tank for the correction of the variation ratio H.

The mass-flow-rate-sensing means preferably has a mechanism comprising two resistors disposed along the path to provide potential difference for sensing the mass flow rate.

The mass flow rate signal is preferably corrected based on the calibration result.

A zero-point-measuring valve for opening or closing the path is preferably disposed at the outlet of the path.

The method of the present invention for calibrating a mass flow controller comprising a calibrating valve disposed on the most upstream side of a path, a mass flow rate control valve mechanism, a tank provided at the path on the upstream side of the mass flow rate control valve mechanism, a mass-flow-rate-sensing means, a pressure-sensing means, a means for controlling the mass flow rate control valve mechanism, and a mass flow rate calibration control means, comprises the steps of (1) permitting a fluid at a set mass flow rate to flow through the path, (2) setting the mass flow rate control valve mechanism at a degree of opening that the mass flow rate of the fluid is equal to the set mass flow rate, (3) closing the calibrating valve, (4) measuring the pressure and mass flow rate of the fluid after a fluid flow from the tank is stabilized, (5) determining a variation ratio of the pressure and mass flow rate to reference pressure and mass flow rate measured by the same procedures in an initial state, and (6) performing calibration depending on the variation ratio.

The variation ratio H in the step (5) is preferably represented by the following formula (1):

$$H = [1-(Af/Ai)] \times 100(\%) \qquad (1),$$

wherein Af is a calibrating comparator represented by a ratio of the product of the decrement of the pressure and the tank volume to an integral value of the mass flow rate, or difference therebetween, and Ai is a reference comparator determined from the reference pressure and mass flow rate in the same way.

The variation ratio H is preferably corrected by the temperature of the fluid.

The stabilization of the fluid flow is preferably determined by comparing any one of the pressure, the mass flow rate, and the comparator and its variation ratio with a predetermined value.

With a zero-point-measuring valve disposed at the outlet of the path for opening or closing the path, the leak of the calibrating valve and the zero-point-measuring valve is preferably tested before calibration.

The leak test is preferably conducted by closing the zero-point-measuring valve, closing the calibrating valve when the pressure of a gas between the calibrating valve and the zero-point-measuring valve has dropped to a predetermined value, and then monitoring the pressure variation of the gas, to determine that there is leak in the calibrating valve when the pressure is elevated, and in the zero-point-measuring valve when the pressure drops.

The method of the present invention for calibrating a mass flow controller comprising a calibrating valve disposed on the most upstream side of the path, a mass flow rate control valve mechanism, a tank provided at the path upstream of the mass flow rate control valve mechanism, a mass-flow-rate-sensing means, a pressure-sensing means, a means for controlling the mass flow rate control valve mechanism, and a mass flow rate calibration control means, the method comprising the steps of (1) permitting a fluid at a set mass flow rate to flow through the path, (2) setting the mass flow rate control valve mechanism at a degree of opening that the mass flow rate of the fluid is equal to the set mass flow rate, (3) closing the calibrating valve, (4) measuring the pressure Pf and mass flow rate Rf of the fluid after a fluid flow from the tank is stabilized, (5) determining a calibrating comparator Af represented by a ratio of the product $\Delta Pf \times V$ of the decrement $\Delta Pf$ of the pressure Pf in a predetermined time period and the tank volume V to an integral value $\Sigma R$ of the mass flow rate, or a difference therebetween, (6) determining a calibrating comparator Ai represented by a ratio of the product $\Delta Pi \times V$ of pressure decrement $\Delta Pi$ in a predetermined time period and the tank volume V to an integral value $\Sigma Ri$ of the mass flow rate, or difference therebetween, from reference pressure Pi and mass flow rate Ri measured in an initial state in the same way as in the step (1)-(4), and (7) performing calibration depending on a variation ratio H represented by the formula of $H=[1-(Af/Ai)] \times 100(\%)$.

The semiconductor-producing apparatus of the present invention comprises at least two mass flow controllers, and pluralities of on-off valves, the on-off valves being operated such that the other mass flow controller can perform mass flow rate control during the calibration of one mass flow controller.

DESCRIPTION OF THE PREFERRED EMBODIMENTS

DESCRIPTION OF THE PREFERRED EMBODIMENTS

[1] Mass Flow Rate Control Apparatus and Its Calibration Method

Figure 1:
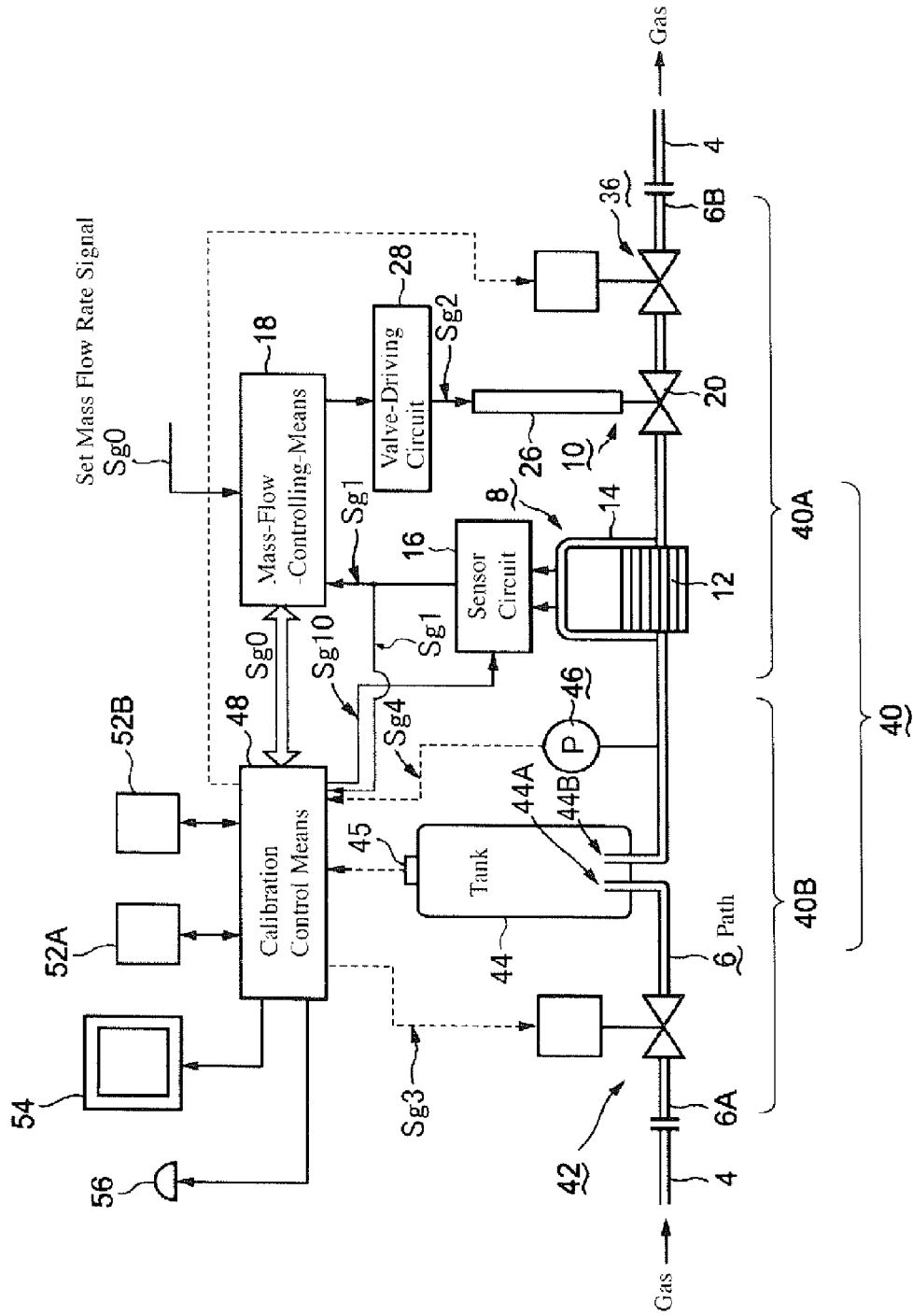
FIG. 1 is a block diagram showing one example of the mass flow controller of the present invention.
Figure 2:
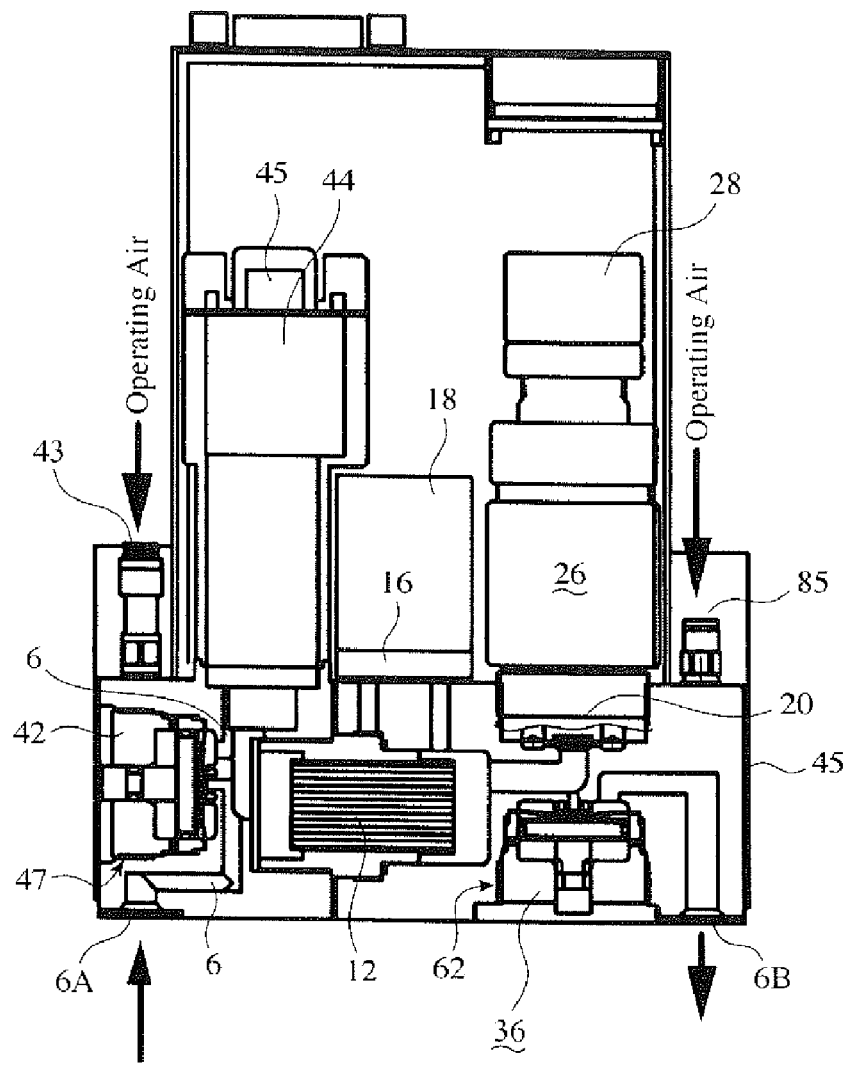
FIG. 2 is a schematic cross-sectional view showing the internal structure of the mass flow controller of the present invention.

The mass flow controller of the present invention and its calibration method are explained in detail referring to the attached drawings below. FIG. 1 exemplifies the mass flow controller 40 of the present invention, and FIG. 2 shows the internal structure of the mass flow controller 40. The same reference numerals are assigned to the same parts shown in FIGS. 13 and 14, with their explanation omitted. However, the same parts need not necessarily be used. Although the mass flow controller of the present invention 40 can be used for any fluid, liquid or gas, explanation will be made taking a gas such as an $N_2$ gas for example. Accordingly, this explanation is applicable without modification to a case where a liquid is used.

The mass flow controller 40 is attached to an intermediate portion of a gas pipe 4 with one end connected to a semiconductor-producing apparatus, which is evacuated, to control the mass flow rate of a gas flowing through the gas pipe 4. The mass flow controller 40 comprises a mass flow rate control part 40A on the downstream side, and a mass flow rate calibration part 40B on the upstream side. The mass flow controller 40 has a path 6 made of stainless steel, etc., and having an inlet 6A connected to the gas pipe 4 on the upstream side, and an outlet 6B connected to the gas pipe 4 on the downstream side.

Figure 13:
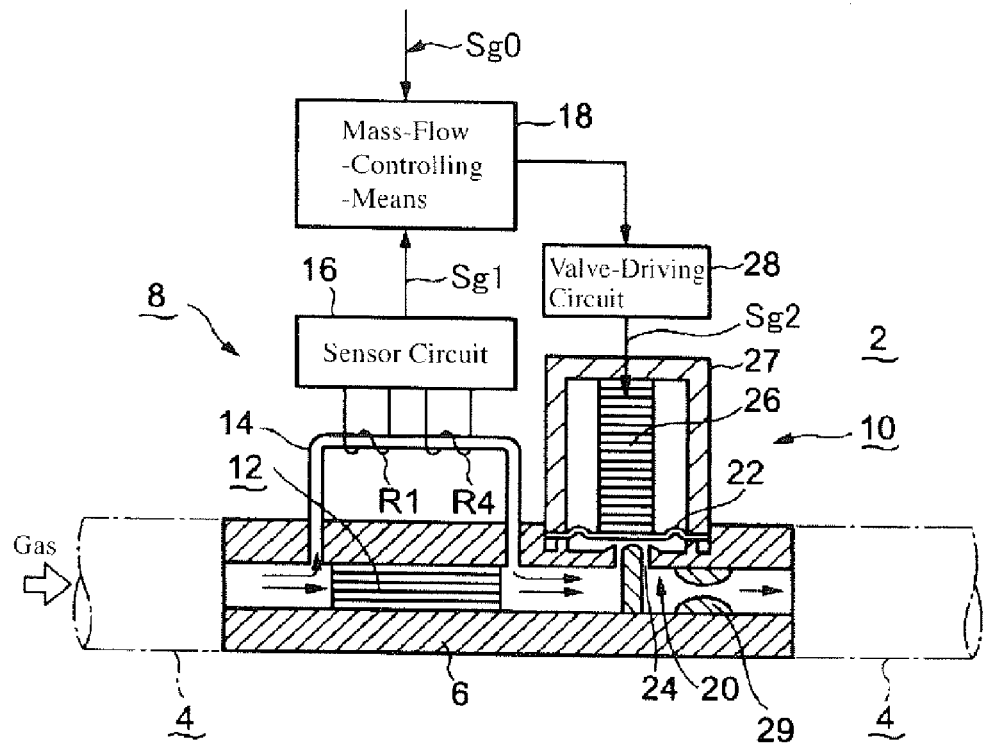
FIG. 13 is a schematic view showing one example of conventional mass flow controllers attached to a gas pipe.

The mass flow rate control part 40A has the same structure as that of the conventional apparatus shown in FIG. 13 except for a zero-point-measuring valve 36 mounted to the path 6 on the downstream side to completely shut a gas flow. Namely, it has a mass-flow-rate-sensing means 8, a mass flow rate control valve mechanism 10, and a mass-flow-controlling means 18. The mass-flow-rate-sensing means 8 comprises bypass pipes 12, a sensor pipe 14 and a sensor circuit 16, to output a signal Sg1 indicating a sensed mass flow rate to the mass-flow-controlling means 18. The mass flow rate control valve mechanism 10 comprises a mass flow rate control valve 20, an actuator 26 for driving the mass flow rate control valve 20, and a valve-driving circuit 28 for outputting a valve-driving voltage S2 to the actuator 26. The mass-flow-controlling means 18 controls the degree of opening the mass flow rate control valve 20 by a PID control method, etc., such that the sensed mass flow rate indicated by the signal Sg1 becomes equal to a set mass flow rate indicated by a signal Sg0 input from an external host computer, etc. In the depicted example, the mass flow rate control valve mechanism 10 is disposed downstream of the mass-flow-rate-sensing means 8, but it may be disposed upstream of the mass-flow-rate-sensing means 8.

The mass flow rate calibration part 40B comprises a calibrating valve 42 for opening or closing the path 6, a tank 44 having a known volume, a means (pressure sensor) 46 for sensing gas pressure, and a calibration control means 48 such as a micro-computer, etc.

The calibrating valve 42 is disposed on the most upstream side of the path 6 to be opened or closed by a valve-switching signal Sg3 from the calibration control means 48. The calibrating valve 42 may be a three-way valve, a small, pneumatic valve equipped with a full-closable diaphragm without an actuator, etc. As shown in FIG. 2, the calibrating valve 42 is received in a recess 47 of a casing 45, and the zero-point-measuring valve 36 is received in a recess 62 of the casing 45. The full-closable diaphragm of the calibrating valve 42 is bent by an operating air introduced through an inlet 43 of the casing 45 to completely open or close the valve. Also, the full-closable diaphragm of the zero-point-measuring valve 36 is bent by an operating air introduced through an inlet 85 of the casing 45 to completely open or close the valve.

The pressure sensor 46 is constituted by, for instance, a capacitance manometer to sense the pressure of a gas in the path 6 and output a pressure signal Sg4 to the calibration control means 48. The tank 44 disposed between the calibrating valve 42 and the pressure sensor 46, through which a gas flowing through the path 6 passes without fail, is made of stainless steel, etc., and has a gas inlet 44A and a gas outlet 44B at its bottom, and a temperature sensor 45 (for instance, platinum temperature sensor) at its ceiling. The tank 44 has a volume of, for instance, about 40 cm$^3$. A temperature signal output from the temperature sensor 45 is input to the calibration control means 48.

The calibration control means 48 comprises a reference data memory 52A for memorizing reference data of pressure and a mass flow rate obtained in an initial state, and a calibrating data memory 52B for memorizing pressure data and mass flow rate data obtained at the time of calibration. Connected to the calibration control means 48 are a means 54 (for instance, liquid crystal display) for displaying calibration results, etc., and a means 56 for giving alert by voice, flashing light, etc. when necessary. The calibration control means 48 outputs a calibrating signal Sg10 to the sensor circuit 16 of the mass-flow-rate-sensing means 8. The calibrating signal Sg10 adjusts the gain of a differential circuit 32 (shown in FIG. 14) in the sensor circuit 16, to correct a mass flow rate signal is Sg1 output from the sensor circuit 16.

It is examined before calibration whether or not the mass flow rate signal Sg1 output from the mass-flow-rate-sensing means 8 is "zero," in a state where a gas flow rate is completely zero. For this purpose, both the calibrating valve 42 and the zero-point-measuring valve 36 are closed to shut the gas path 6 in the flow rate control means 40 completely from outside, and the mass flow rate control valve 20 of the mass-flow-rate-sensing means 8 is opened so that communication is kept in the apparatus 40. After a gas flow has completely stopped in the path 6, the mass flow rate signal Sg1 is obtained. When the mass flow rate signal Sg1 is deviated from a zero-point, the amount of deviation from the zero-point is memorized in the calibration control means 48. This zero-point correction guarantees the accuracy of the measured mass flow rate.

The mass flow controller 40 is operated in two modes, a mass flow rate control mode and a mass flow rate calibration mode. The mass flow rate calibration mode comprises a reference-data-obtaining routine for obtaining the data of pressure and a mass flow rate as a reference for calibration (reference pressure data and reference mass flow rate data) in an initial state (for instance, when the apparatus 40 is shipped from a factory or installed in a clean room, etc.), and a calibration routine for examining periodically or irregularly in a clean room, etc. whether the accuracy of the mass flow rate control is high or low.

Figure 14:
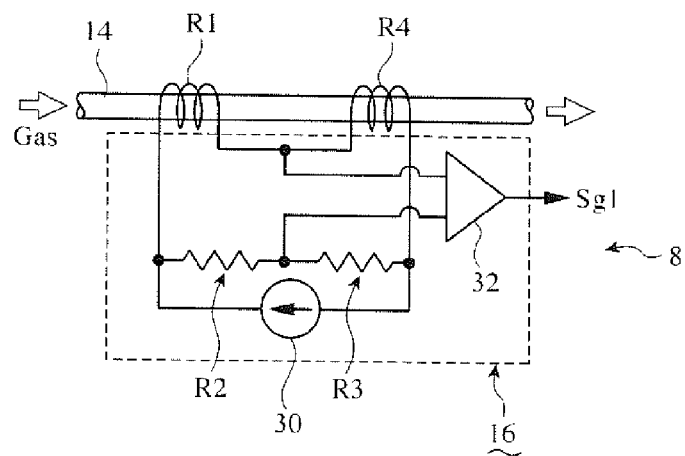
FIG. 14 is a schematic view showing the structure of a mass-flow-rate-sensing means in the mass flow controller of FIG. 13.
Figure 15:
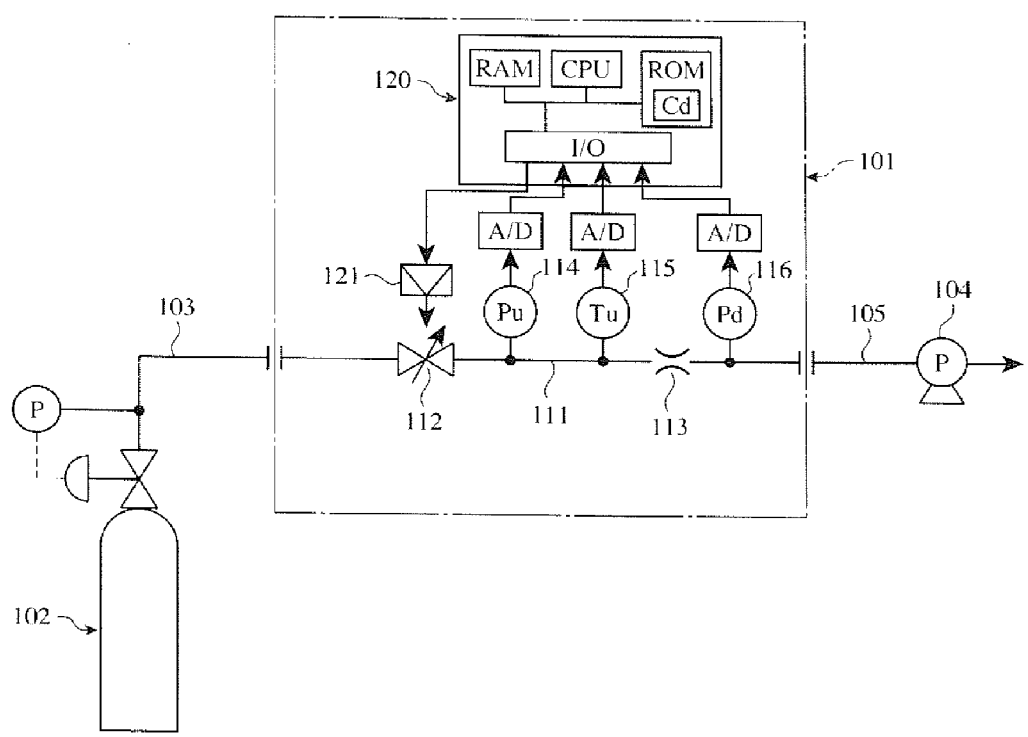
FIG. 15 is a schematic view showing another example of conventional mass flow controllers.

The mass flow rate control mode is the same as the operation explained referring to FIGS. 13 and 14, during which the mass flow rate calibration part 40B is idle. The mass-flow-controlling means 18 in the mass flow rate control part 40A controls the degree of opening the mass flow rate control valve 20 by a PID control method, etc., such that the set mass flow rate indicated by the signal Sg0 is equal to the sensed mass flow rate indicated by the signal Sg1. The measurement of the mass flow rate is conducted at a predetermined interval (for instance, 1 msec). A gas with a controlled mass flow rate is supplied downstream to a semiconductor-producing apparatus, etc.

(A) Principle of Mass Flow Rate Calibration

Figure 3A:
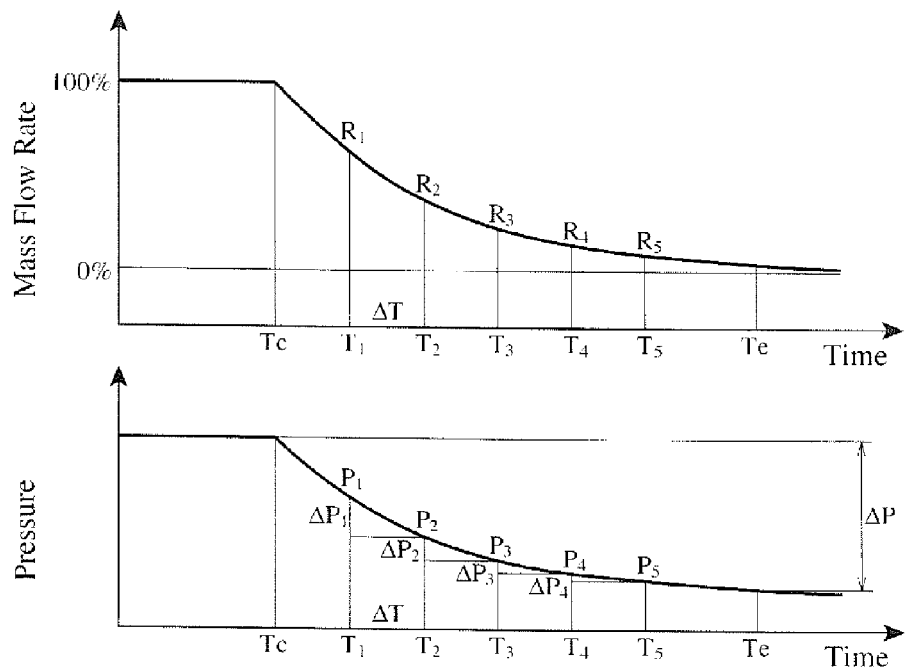
FIG. 3(a) is a graph showing the variation of mass flow rate and pressure with time.
Figure 3B:
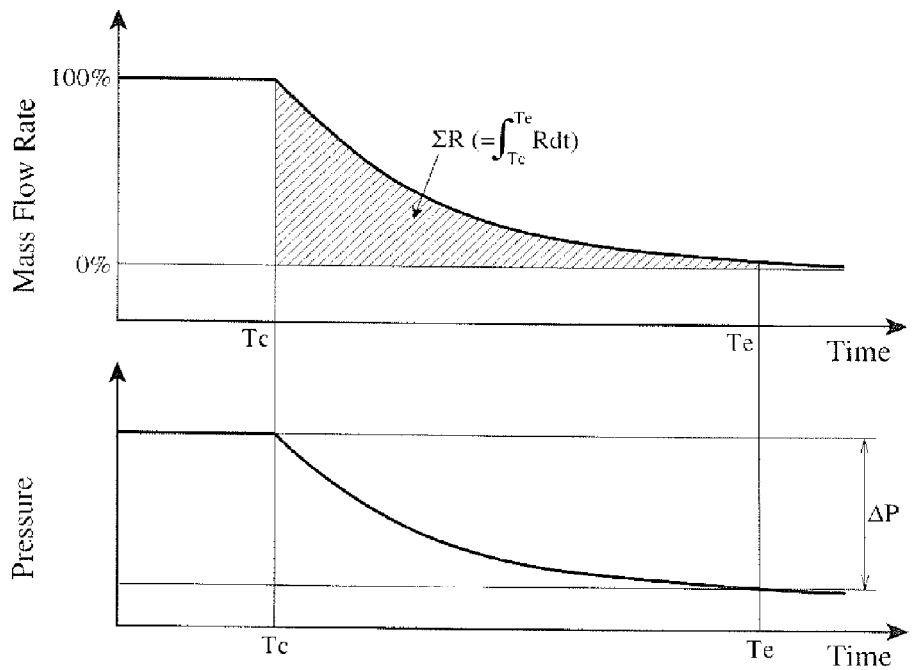
FIG. 3(b) is a graph showing the relation between the product of pressure drop and a tank volume and an integral value of the mass flow rate.

FIG. 3 shows the variation of mass flow rate and pressure with time after the calibrating valve 42 is closed. When the calibrating valve 42 is completely closed at the time of Tc with the degree of opening the valve 10 fixed in a state where a gas is flowing at a constant flow rate, the mass flow rate and pressure sensed by the mass-flow-rate-sensing means 8 and the pressure sensor 46, respectively, decrease gradually, finally resulting in a zero mass flow rate and pressure equal to that in a downstream gas pipe 4 (for instance, vacuum or atmospheric pressure).

As shown in FIG. 3(*a*), the mass flow rate varies $R_1$, $R_2$, $R_3$ . . . , and the pressure varies $P_1$, $P_2$, $P_3$ . . . at a sampling time of $T_1$, $T_2$, $T_3$ . . . The mass of a gas flowing from the tank 44 during a period Tc-$T_1$ is equal to an integral value of the mass flow rate during that period, and the mass of a gas flowing from the tank 44 during a period $T_1$-$T_2$ is equal to an integral value of the mass flow rate during that period. Accordingly, the mass of a gas flowing from the tank 44 during a period from the time Tc of closing of the calibrating valve 42 to the time Te of terminating the calibration is equal to an integral value $\Sigma R$ of the mass flow rate R during that period. $\Sigma R$ is represented by the following formula (2):

$$\Sigma R = \int_{Tc}^{Te} R dt. \tag{2}$$

The mass of a gas flowing from the tank 44 during a period Tc-$T_1$ is also equal to the product of a pressure decrement $\Delta P_1$ during that period and the volume V of the tank 44, and the mass of a gas flowing from the tank 44 during a period $T_1$-$T_2$ is equal to the product of a pressure decrement $\Delta P_2$ during that period and the volume V of the tank 44. Accordingly, the mass of a gas flowing from the tank 44 during a period from the time Tc of closing of the calibrating valve 42 to the time Te of terminating the calibration is equal to $\Delta P_1 \times V + \Delta P_2 \times V + \ldots = \Delta P \times V$.

If the mass flow controller 40 underwent no variation with time, the product ($\Delta P \times V$) of a pressure decrement $\Delta P$ during a period from Tc to Te and the volume V of the tank 44 would be equal to an integral value $\Sigma R$ of the mass flow rate as shown in the following formula (3):

$$\Delta P \times V = \Sigma R \tag{3}$$

However, if the mass flow controller 40 varied with time, the formula (1) would not be satisfied. The larger the variation with time of the mass flow controller 40, the larger the difference between $\Delta P \times V$ and $\Sigma R$. Accordingly, the comparison of the difference of $\Delta P \times V$ from $\Sigma R$ between in the initial state and after the lapse of time can determine how much variation with time has proceeded. Used to determine the degree of variation with time quantitatively is a comparator A represented by the ratio of $\Delta P \times V / \Sigma R$ or the difference of $\Delta P \times V - \Sigma R$. The comparator A in the initial state is identified as Ai, and the comparator A after the lapse of time is identified as Af. A variation ratio H of Af to Ai represents a change ratio of the mass flow rate by variation with time. Taking the variation ratio H of +2% for example, even if the set mass flow rate is 90%, the flow rate of a gas actually flowing through the mass flow rate control valve 20 is 90%×1.02=91.8%. Accordingly, if the mass flow rate signal Sg1 is calibrated to 90/91.8=1/1.02 times, the flow rate of a gas actually flowing through the mass flow rate control valve 20 would be 90%. Thus, the correction of the mass flow rate signal Sg1 according to the variation ratio H can adjust the flow rate of a gas actually flowing through the mass flow rate control valve 20 to a set level. The calibrating signal Sg10 is output to the sensor circuit 16 of the mass-flow-rate-sensing means 8, to correct the mass flow rate signal Sg1 output from the sensor circuit 16. It is thus possible to perform the calibration of the mass flow controller 40 by the variation ratio H of is the comparator determined from $\Delta P \times V$ and $\Sigma R$.

To perform the calibration of the mass flow controller 40, it is necessary to conduct a routine for obtaining the data (reference data) of pressure and a mass flow rate in the initial state, and a routine for obtaining the data (calibrating data) of pressure and a mass flow rate for calibration with the apparatus 40 disposed in a semiconductor-producing apparatus.

(B) First Calibration Method (1) Reference-Data-Obtaining Routine

Figure 4:
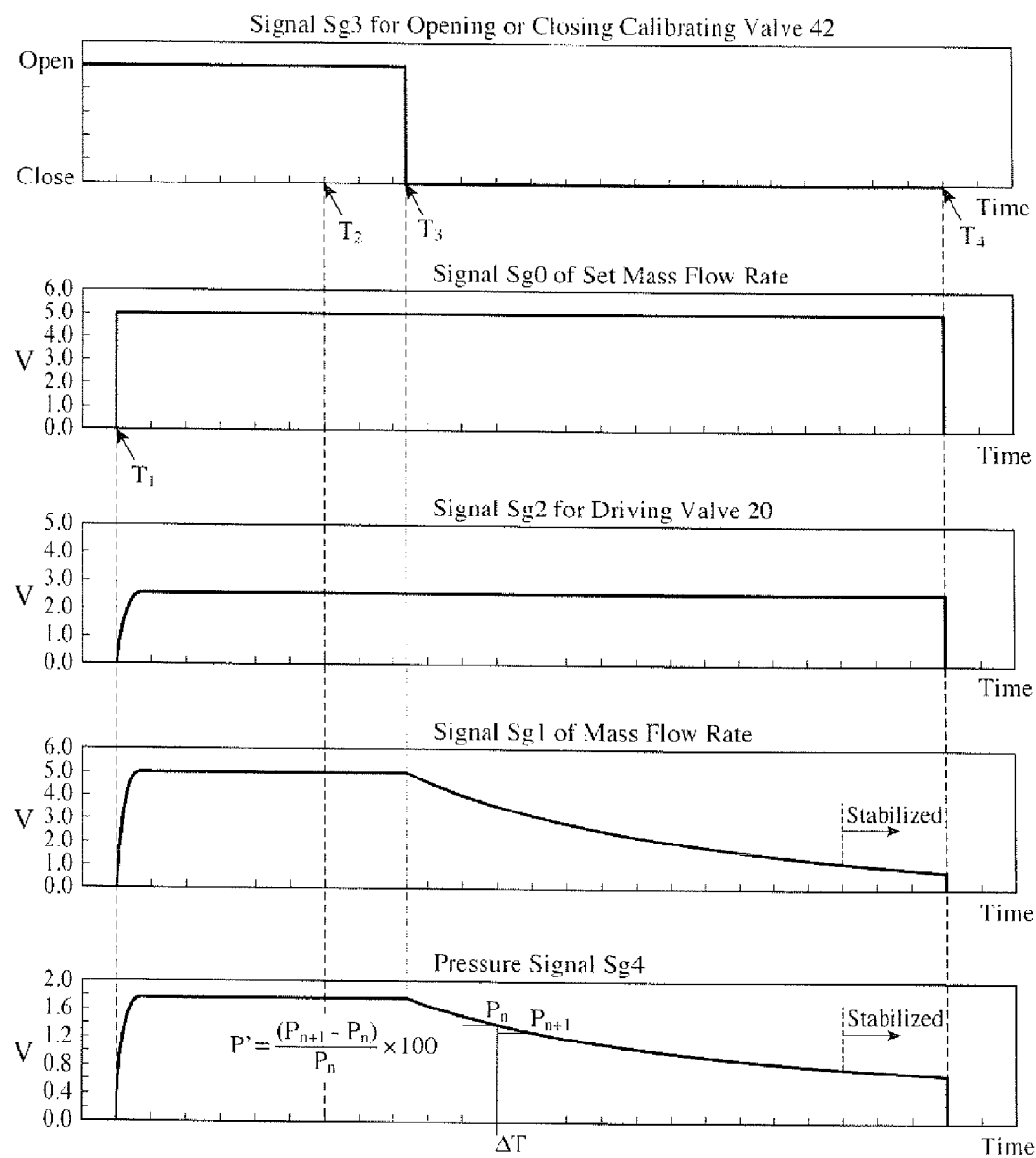
FIG. 4 is a chart showing the timing of each signal in the mass flow controller in a calibration mode.
Figure 5:
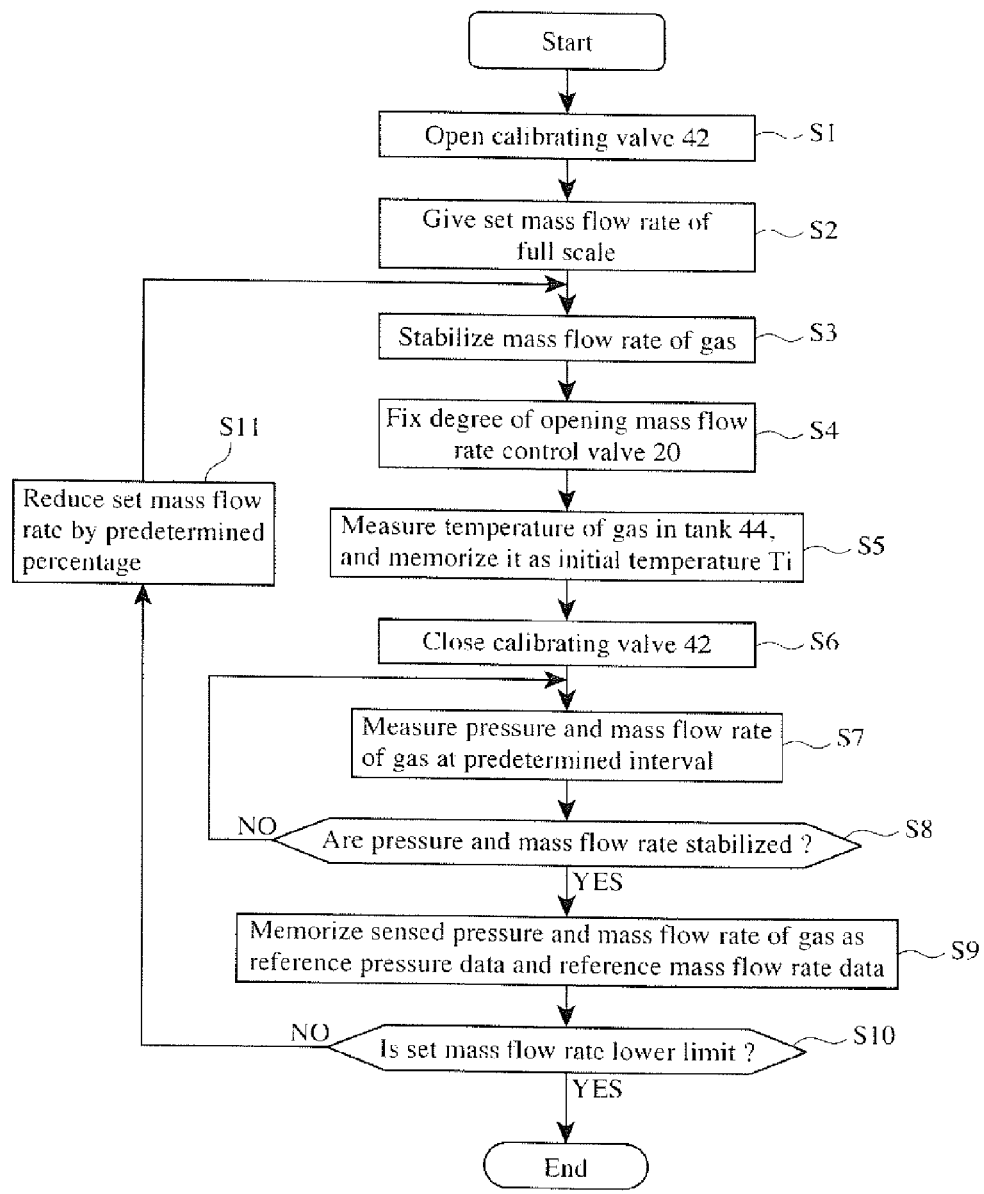
FIG. 5 is a flow chart showing the steps of the reference-data-obtaining routine.

FIG. 4 shows the variation of each signal with time in the mass flow rate calibration mode, and FIG. 5 shows the steps of the reference-data-obtaining routine. The calibrating valve 42 is first opened (step S1), to fill the tank 44 with a gas. The downstream side of the gas pipe 4 may be evacuated. The set mass flow rate signal Sg0 is sent from an external host computer or the calibration control means 48 to the mass-flow-controlling means 18 at the time $T_1$ (step S2). Because the set mass flow rate signal Sg0 is adjustable within a range of 0-5 V, for instance, calibration should be conducted in all the range. For this purpose, for instance, a set mass flow rate signal Sg0 decreasing from 100% (full scale, 5 V) to the minimum level (for instance, 10%) by 10% is sent to the mass-flow-controlling means 18. The degree of opening the mass flow rate control valve 20 is controlled, for instance, by a PID control method, such that the mass flow rate signal Sg1 is equal to the set mass flow rate signal Sg0.

When the set mass flow rate signal Sg0 of a full scale as an initial setting is sent to the mass-flow-controlling means 18, which supplies a valve-driving voltage S2 to the mass flow rate control valve mechanism 10 via the valve-driving circuit 28, to open the mass flow rate control valve 20 to a degree determined by Sg0. The gas starts to flow downstream with its mass flow rate sensed by the mass-flow-rate-sensing means 8, and the mass flow rate signal Sg1 is input to the mass-flow-controlling means 18 and the calibration control means 48. The pressure of the gas is sensed by the pressure sensor 46, whose pressure signal Sg4 is input to the calibration control means 48.

After the mass flow rate of the gas is stabilized with the predetermined time (for instance, about 6 seconds) lapsed (step S3), the valve-driving voltage S2 was fixed to a voltage level at the time T2, thereby fixing the degree of opening the mass flow rate control valve 20 (step S4). After several seconds have passed with the valve-driving voltage S2 fixed, the temperature of a gas in the tank 44 is sensed by the temperature sensor 45 and memorized as an initial temperature Ti (step S5).

Immediately after memorizing the initial temperature Ti, the calibration control means 48 outputs a signal Sg3 for closing the calibrating valve 42 at the time $T_3$ (step S6). Shutting the supply of a gas, the gas in the tank 44 starts to flow out, resulting in gradual decrease in the mass flow rate signal Sg1 and the pressure signal Sg4.

The pressure and mass flow rate of the gas is measured at a predetermined sampling interval (for instance, 1 msec) (step S7), and the variation ratio of pressure or a mass flow rate is used to determine whether or not the gas flow is stabilized (step S8). The case of using the change ratio of pressure will be explained. For instance, when the pressure changes from Pn to Pn+1 during a time period $\Delta T$ as shown in FIG. 4, the change ratio P' of pressure is expressed by $[(Pn+1-Pn)/Pn] \times 100(\%)$. When P' becomes, for instance, 0.1% or less, it is determined that the pressure (gas flow) has been stabilized. The pressure and mass flow rate measured at the time T4 after the stabilization of the gas flow are memorized in the reference data memory 52A as a reference pressure Pie and a reference mass flow rate Rie at the set mass flow rate of a full scale (step S9).

Because calibration should be conducted at different set mass flow rates as described above, the set mass flow rate is reduced, for instance, by 10% until it reaches a lower limit (for instance, 10%), to obtain the reference pressure data Pie and the reference mass flow rate data Rie at each set mass flow rate. Specifically, when the set flow rate is not a lower limit (in the case of NO at the step S10), the set mass flow rate is reduced by every 10% (step S11), to repeat steps S3-S9 until the set mass flow rate reaches the lower limit, and memorize the reference pressure data Pie and the reference mass flow rate data Rie in the reference data memory 52A at each set mass flow rate.

(2) Calibration Routine

Figure 6:
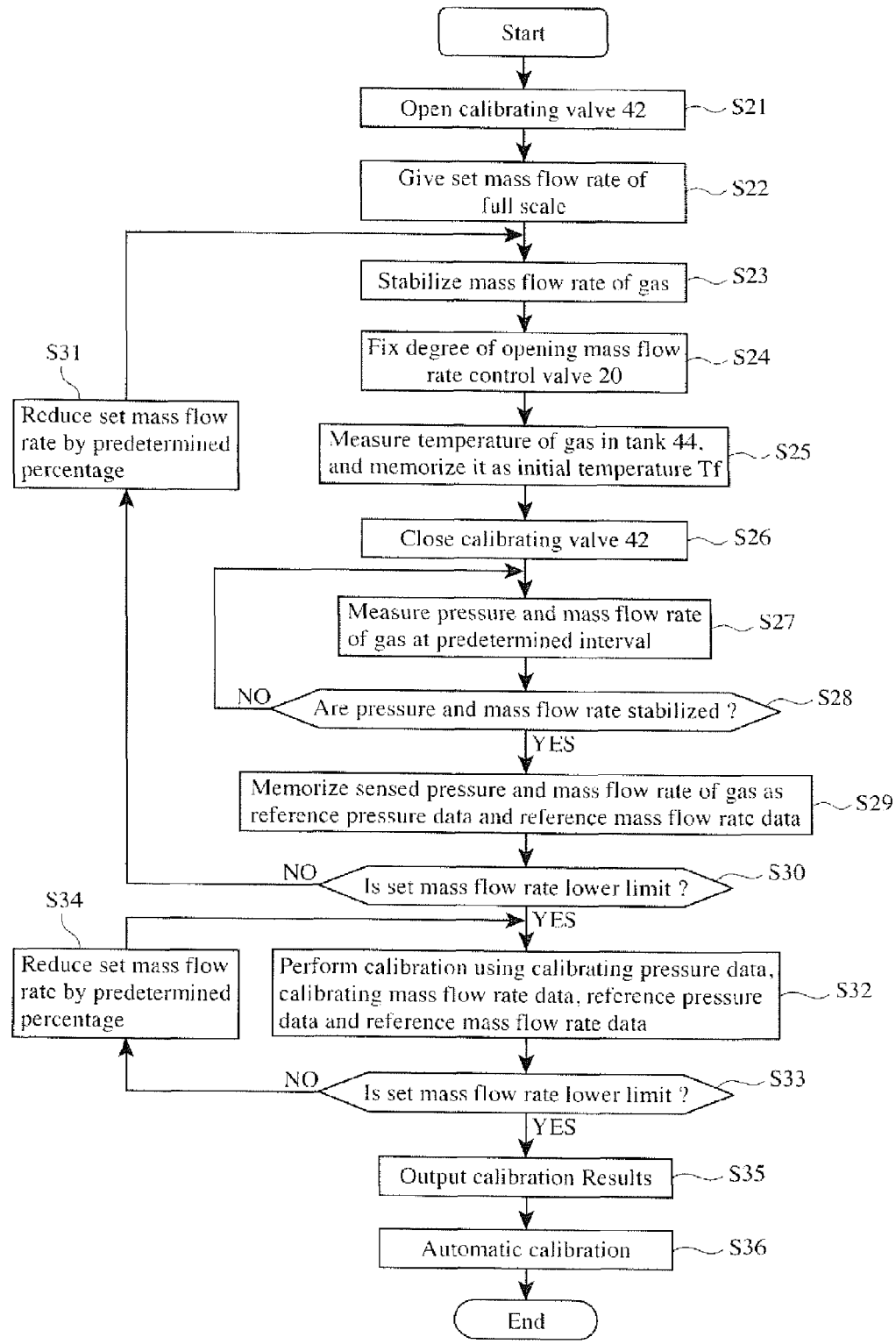
FIG. 6 is a flow chart showing the steps of the calibration routine in the first calibration method.
Figure 7:
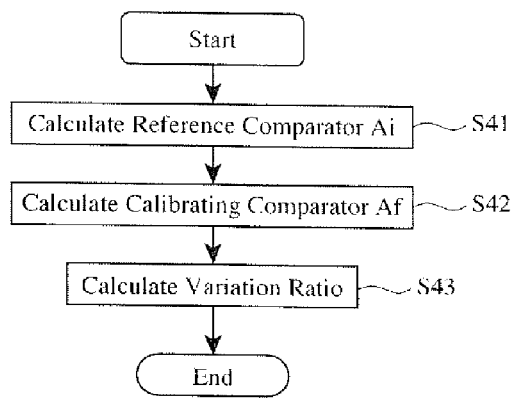
FIG. 7 is a flow chart showing the calibration steps in the calibration routine.

To examine the variation of the mass flow controller 40 with time, a calibration routine is periodically or irregularly conducted with the apparatus 40 assembled in a gas-supporting line of a clean room in a semiconductor-producing apparatus, etc. FIG. 6 shows a first calibration routine, and FIG. 7 shows a calibration step in the calibration routine. The steps S21-S31 in the first calibration routine are essentially the same as the steps S1-S11 in the reference-data-obtaining routine shown in FIG. 5. Accordingly, the variation of each signal in the calibration routine is as shown in FIG. 4. As in the reference-data-obtaining routine, the set mass flow rate signal Sg0 is reduced from the full scale (100%) to 10% by every 10%, to perform the calibration routine.

After the calibrating valve 42 is opened (step S21), the set mass flow rate signal Sg0 is set to a full scale (100%) at the time $T_1$ (step S22). The gas starts to flow downstream, and the pressure and mass flow rate of the gas are sensed. The pressure signal Sg4 is input to the calibration control means 48, and the mass flow rate signal Sg1 is input to the control means 18 and the calibration control means 48. The degree of opening the mass flow rate control valve 20 is controlled by a PID control method such that the mass flow rate signal Sg1 is equal to the set mass flow rate signal Sg0. After the gas flow is stabilized with the predetermined time (for instance, about 6 seconds) lapsed (step S23), the degree of opening the valve 20 is fixed at the time T2 (step S24). After several seconds have further passed, the temperature Tf of the tank 44 sensed by the temperature sensor 45 is memorized (step S25).

Immediately after the temperature Tf is memorized, the calibration control means 48 outputs a signal Sg3 at the time T3 to close the calibrating valve 42 (step S26). With the supply of the gas shut, the gas in the tank 44 starts to flow out, resulting in gradual decrease in the mass flow rate signal Sg1 and the pressure signal Sg4. The pressure and mass flow rate of the gas are measured at a predetermined interval (for instance, 1 msec) (step S27), to determine by the same method as described above whether or not the gas flow has been stabilized (step S28). After the gas flow has been stabilized, the pressure and mass flow rate at the set mass flow rate of a full scale are memorized as a calibrating pressure Pfe and a calibrating mass flow rate Rfe in the calibrating data memory 52B at the time T4 (step S29).

Like the reference data, calibrating data should be taken at different set mass flow rates. Accordingly, when the set mass flow rate is not a lower limit of 10%, for instance, (in the case of NO in the step S30), the set mass flow rate is reduced, for instance, by every 10% to repeat the steps S23-S29, until it reaches the lower limit (step S31), and the calibrating pressure and the calibrating mass flow rate are memorized in the calibrating data memory 52B at each set mass flow rate.

Using the reference data and the calibrating data, the calibration shown in FIG. 7 (corresponding to the step S32 in FIG. 6) is conducted. The ratio of the product ($\Delta Pie \times V$) of the reference pressure decrement $\Delta Pie$ and the volume V of the tank 44 to an integral value $\Sigma Rie$ of the reference mass flow rate, a reference comparator Ai ($=\Delta Pie \times V/\Sigma Rie$), is calculated based on the reference pressure data and the reference mass flow rate data memorized in the reference data memory 52A at the step S41. The ratio of the product ($\Delta Pfe \times V$) of the pressure decrement $\Delta Pfe$ and the volume V of the tank 44 to an integral value $\Sigma Rfe$ of the mass flow rate, a calibrating comparator Af ($=\Delta Pfe \times V/\Sigma Rfe$), is calculated based on the calibrating pressure data Pfe and the calibrating mass flow rate data Rfe memorized in the calibrating data memory 52B at the step S42.

The comparator A may be a difference ($\Delta P \times V - \Sigma R$) in place of the ratio ($\Delta P \times V/\Sigma R$). In this case, Ai=$\Delta Pie \times V - \Sigma Rie$, and Af=$\Delta Pfe \times V - \Sigma Rfe$.

Figure 8:
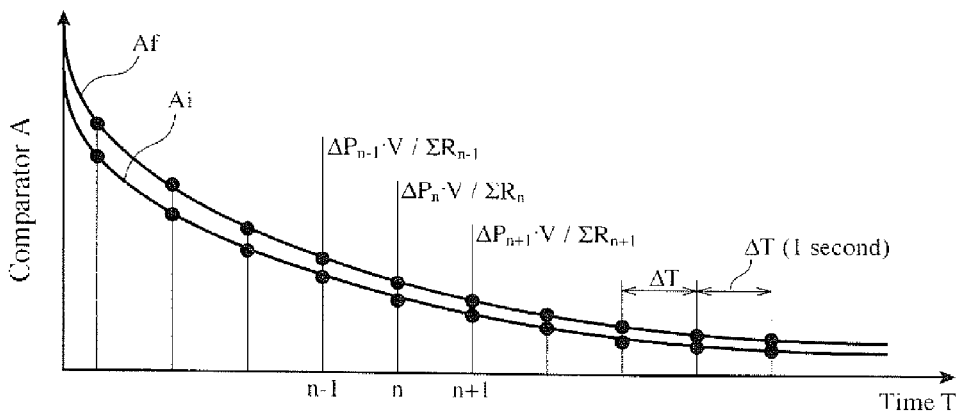
FIG. 8 is a graph showing the variation with time of a comparator A, a ratio $\Delta P \times V / \Sigma R$, wherein $\Delta P \times V$ is the product of pressure decrement $\Delta P$ and a tank volume V, and $\Sigma R$ is an integral value of the mass flow rate.

Because the reference comparator Ai and the calibrating comparator Af are calculated based on the pressure and the mass flow rate measured after the gas flow has been stabilized in the first calibration method, Ai and Af are not functions of time. However, if the reference comparator Ai and the calibrating comparator Af were calculated whenever the pressure and the mass flow rate are measured at sampling intervals, the variations of the comparators Ai, Af with time would be as shown in FIG. 8. In the example shown in FIG. 8, the comparator A is $\Delta P \times V/\Sigma R$, and n is the number of sampling. Why both comparators Ai, Af are large at the beginning is due to the fact that a gas flow passing through the heat-conductive, mass-flow-rate-sensing means 8 is fast at the start of measurement, resulting in large sensing delay of the mass flow rate. If a quick-response ultrasonic nozzle were used as the mass-flow-rate-sensing means, the sensing delay of the mass flow rate would be extremely small, but the ultrasonic nozzle cannot be used without high gas pressure, not applicable in a wide range. Even with the heat-conductive, mass-flow-rate-sensing means 8, longer calibration time leads to a larger pressure decrement $\Delta P$ and a larger integral value $\Sigma R$ of the mass flow rate, resulting in improved calibration accuracy. To make the calibration time longer, a stricter reference need only be used to determine the stabilization of the gas flow (for instance, the change ratio of pressure is changed to 0.05%), or the tank volume need only be increased.

A curve of the reference comparator Ai and a curve of the calibrating comparator Af are slightly deviated from each other because of the variation of the mass flow controller 40 with time. Accordingly, if this deviation is quantitatively expressed, it can be used for the calibration of the mass flow controller 40. Specifically, the variation ratio H of the calibrating comparator Af to the reference comparator Ai is determined at the step S43 by the following formula (4):

$$H=[1-(Af/Ai)]\times 100(\%) \tag{4}$$

Figure 9:
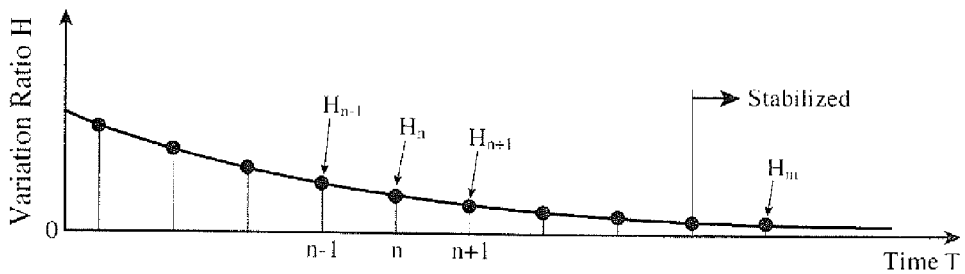
FIG. 9 is a graph showing the variation of the variation ratio H with time.

The variation ratio H corresponds to the change ratio of the mass flow rate. Although the comparators Ai, Af are obtained after the stabilization of the gas flow in the first calibration method, the variation ratio H would be as shown in FIG. 9 if it were calculated every sampling. The variation ratio H is relatively large at the beginning of calibration, but gradually decreases and is finally stabilized. If there were no variation with time in the apparatus 40 at all, the variation ratio H would converge to zero. However, the variation of the apparatus 40 with time actually makes the variation ratio H remain at a certain level Hm even after the gas flow has been stabilized. Hm can be determined by averaging the variation ratios H obtained by sampling plural times (for instance, 5 times) after stabilization.

The formula (4) does not take the influence of temperature into account. The temperature-corrected variation ratio H is obtained by the following formula (5):

$$H=[1-(Af/Ai)\times(273.15+Ti)/(273.15+Tf)]\times 100(\%) \tag{5}$$

wherein Ti is an initial temperature in the tank 44 measured at the step S5 shown in FIG. 5, and Tf is a temperature in the tank 44 at the time of calibration measured at the step S25 shown in FIG. 6.

The variation ratio Hm after stabilization is memorized and displayed on a display means 54 at the step S33 shown in FIG. 6. A time at which the variation ratio Hm exceeds a predetermined value may be used as a measure of exchanging the mass flow controller 40.

The sensor circuit 16 is automatically calibrated based on the variation ratio Hm, so that a correct mass flow rate signal Sg1 is output (step S34). This calibration can be performed by adjusting the gain of an amplifier, a differential circuit 32 (see FIG. 14), in the sensor circuit 16. The calibration results and data may be sent to a host computer, etc. to produce a database. When calibration error exceeds a range permitted in advance, an alarm means 56 is operated to alert an operator. With the completion of automatic calibration, the calibration routine is terminated.

In place of knowing if the change ratio of pressure has become within a predetermined range (for instance, 0.1%) to determine whether or not the gas flow has been stabilized, the change ratio (or amount of change) of the comparator A or the variation ratio H may be used for the determination.

In the case of using the comparator A, the stabilization of the gas flow is determined by whether or not the change ratio (or amount of change) $\Delta A$ of the comparator A obtained by every sampling has become a predetermined value (for instance, 0.1%) or less.

(a) When Comparator A is Ratio of $\Delta P \times V$ to $\Sigma R$ $$\Delta A = (\Delta P_n \times V / \Sigma R_n - \Delta P_{n+1} \times V / \Sigma R_{n+1})/(\Delta P_n \times V / \Sigma R_n) \tag{6}$$

$$= (\Delta P_n / \Sigma R_n - \Delta P_{n+1} / \Sigma R_{n+1})/(\Delta P_n / \Sigma R_n)$$

(b) When Comparator A is Difference of ΔP×V from ΣR $$\Delta A=[(\Delta P_n \times V-\Sigma R_n)-(\Delta P_{n+1} \times V-\Sigma R_{n+1})]/(\Delta P_n \times V-\Sigma R_n) \quad (7)$$

When the comparator A is the difference of ΔP×V from ΣR, ΔA is influenced by products, etc. attached to an inner wall of the tank 44, which change the volume V of the tank 44 from an initial one, because the formula (7) includes the terms of the volume V of the tank 44. On the other hand, when the comparator A is a ratio of ΔP×V to ΣR, the change of the volume V of the tank 44 from an initial one does not affect ΔA, because the formula (2) does not include the terms of the volume V of the tank 44.

In the case of using the variation ratio H, the stabilization of the gas flow is determined by whether or not the change ratio (or amount of change) ΔH of the variation ratios $H_n$, $H_{n-1}$ obtained by every sampling has become a predetermined range (for instance, 0.1%) or less. The change ratio ΔH of the variation ratio H is represented by the following formula (8):

$$\Delta H=(H_n-H_{n-1})/H_n \quad (8)$$

(3) Calibration Experiment

The following calibration evaluations were conducted on 10 mass flow controllers MFC of the present invention having different flow rate ranges within a range of 10-5000 SCCM (flow rate per one minute at atmospheric pressure). The results are shown in Table 1. The flow rate range of MFC of No. 8 was divided to two.

(a) Repeatability at Constant Pressure

In an initial state where the pressure of a gas flowing through path 6 is 0.2 MPa, a reference comparator Ai(=ΔPi× V/ΣRi) was obtained by the reference-data-obtaining routine shown in FIG. 5. Immediately thereafter, the initial state, to obtain calibrating comparators $Af_1$, $Af_2$. The difference ($|H_1-H_2|$) between the variation ratios $H_1$, $H_2$ depends on the inevenness of the measured mass flow rate. Accordingly, the repeatability (level of error to the set mass flow rate) at a constant pressure was evaluated by $|H_1-H_2|$.

(b) Repeatability at Different Pressures

Two variation ratios $H_1$, $H_2$ were obtained by the same method as in (a) is above, except for changing the pressure of a gas flowing through the path 6 from 0.2 MPa in the initial state to 0.25 MPa (+0.05 MPa) at the calibration step. The repeatability at different pressures was evaluated by $|H_1-H_2|$.

SCCM, less than the guaranteed value of 2.50%. This indicates that flow rate calibration can be performed with good repeatability in a wide flow rate range.

(C) Second Calibration Method

Figure 10:
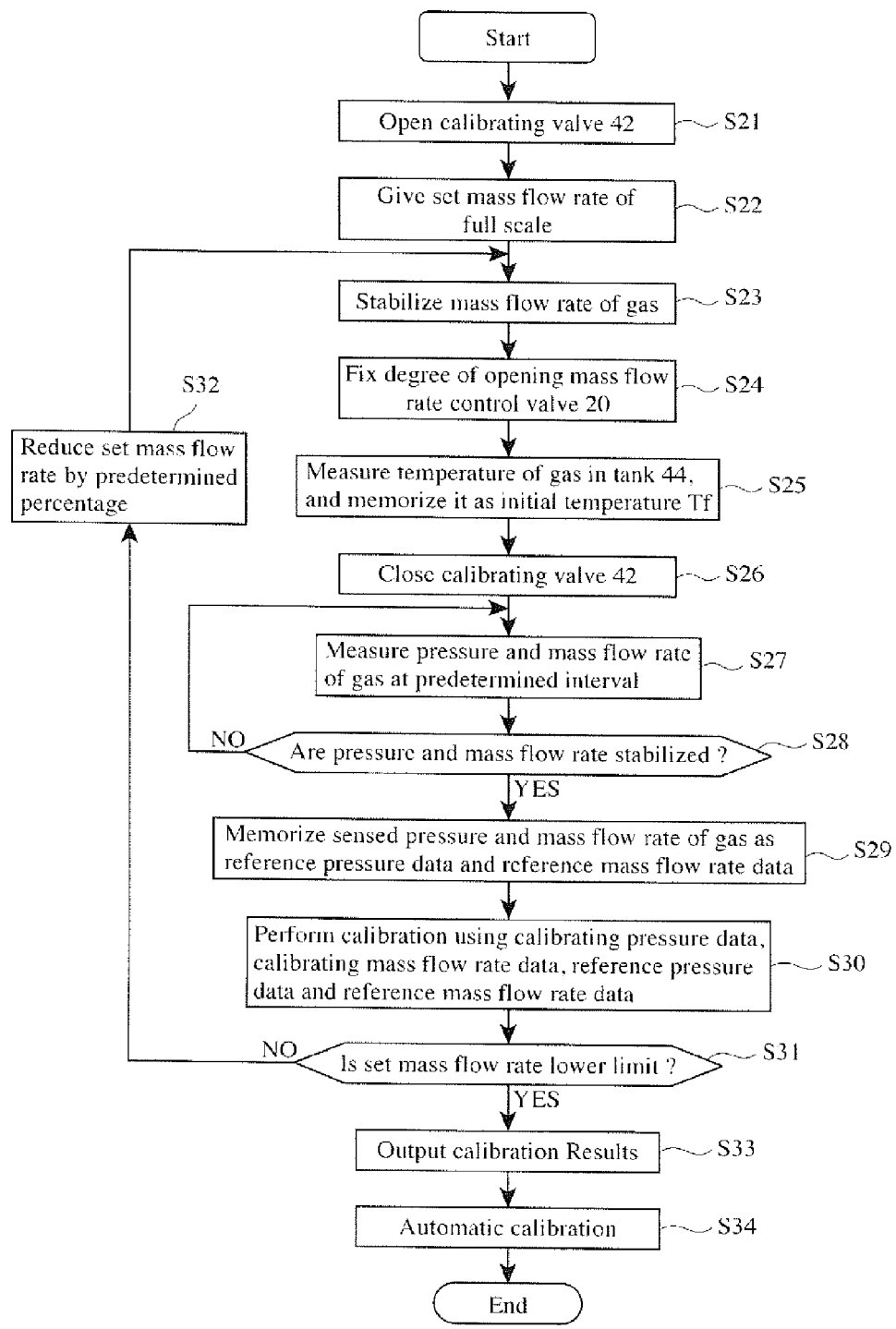
FIG. 10 is a flow chart showing a calibration routine in the second calibration method.

Although the step S30 of determining whether or not the set mass flow rate is a lower limit is conducted before the calibration step S32 in the first calibration method, with the reference data and the calibrating data obtained at different set mass flow rates memorized, the calibration step S30 may be conducted at each set mass flow rate as shown in FIG. 10. In this case, the reference-data-obtaining routine is also changed as shown in FIG. 10.

(D) Third Calibration Method

The reference comparator Ai may be calculated and memorized in the reference data memory 52A at a time when the reference pressure data and the reference mass flow rate data are obtained, and the calibrating comparator Af may be calculated at a time when the pressure data and the mass flow rate data for calibration are obtained. In this case, because the reference comparator Ai and the calibrating comparator Af change with the number of sampling, the change ratio of the comparator may be used to determine the stabilization of the gas flow.

(D) Leak Test of Valves

In the calibration of the mass flow controller, it is necessary that there is no leak in the calibrating valve 42 and the zero-point-measuring valve 36. If the calibrating valve 42 were leaking, the pressure decrement ΔP would be inaccurate. Also, if the zero-point-measuring valve 36 were leaking, the zero-point correction of the mass-flow-rate-sensing means 8 would be inaccurate. Accordingly, the leak of the calibrating valve 42 and the zero-point-measuring valve 36 is tested before zero-point correction and calibration.

Figure 11:
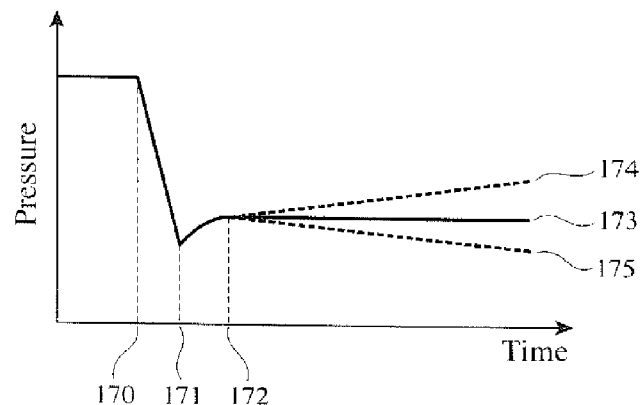
FIG. 11 is a graph showing the variation with time of pressure between a calibrating valve and a zero-point-measuring valve in a leak test.

FIG. 11 shows pressure variation when the calibrating valve 42 and the zero-point-measuring valve 36 are closed successively. When the calibrating valve 42 is closed at the time 170, pressure between the calibrating valve 42 and the zero-point-measuring valve 36 rapidly decreases. The zero-point-measuring valve 36 is closed at the time 171 at which a predetermined pressure drop (for instance, 0.03 MPa) is observed. Using as a reference the pressure measured at the time 172 after the lapse of time necessary for stabilizing the

TABLE 1

| MFC No. | Flow Rate Range (SCCM) | Repeatability at Constant Pressure | Repeatability at Different Pressures | Total Repeatability[1] | Guaranteed Repeatability |
|---|---|---|---|---|---|
| 1 | 10-14 | 0.34% | 0.97% | 1.31% | ±1.50% |
| 2 | 15-27 | 0.28% | 0.98% | 1.26% | |
| 3 | 28-38 | 0.27% | 1.04% | 1.31% | |
| 4 | 39-71 | 0.58% | 0.87% | 1.45% | |
| 5 | 72-103 | 0.52% | 0.87% | 1.39% | |
| 6 | 104-192 | 0.49% | 0.67% | 1.16% | |
| 7 | 193-279 | 0.43% | 0.84% | 1.27% | |
| 8 | 280-400 | 0.45% | 0.89% | 1.34% | |
| | 401-754 | 0.88% | 1.01% | 1.89% | ±2.50% |
| 9 | 755-2037 | 1.05% | 1.28% | 2.33% | |
| 10 | 2038-5000 | 1.11% | 1.24% | 2.35% | |

Note:
[1]Repeatability at constant pressure + repeatability at different pressures.

As is clear from Table 1, the repeatability at a constant pressure was as good as 0.34-1.11%. The repeatability at different pressures was also as good as 0.97-1.24%. Accordingly, the total repeatability was 1.16-1.45% in a flow rate range of 10-400 SCCM, less than the guaranteed value of 1.50%, and 1.89-2.35% in a flow rate range of 401-5000 pressure (for instance, 2-4 seconds), the pressure variation is monitored for 10 seconds, for instance. If the pressure increases as a line 174, it is determined that there is leak in the calibrating valve 42. Alternatively, if the pressure decreases as a line 175, it is determined that there is leak in the zero-point-measuring valve 36. If there is leak in the calibrating valve 42 or the zero-point-measuring valve 36, the mass flow controller 40 outputs a signal indicating that the valve is abnormal, stopping the calibration. If there is no pressure variation as a line 173, it is determined that both of the calibrating valve 42 and the zero-point-measuring valve 36 are normal, thereby proceeding to the zero-point correction or the flow rate calibration. The leak test of the calibrating valve 42 and the zero-point-measuring valve 36 before the zero-point correction and the flow rate calibration results in further improvement in the accuracy of the calibration.

[2] Semiconductor-Producing Apparatus

Figure 12:
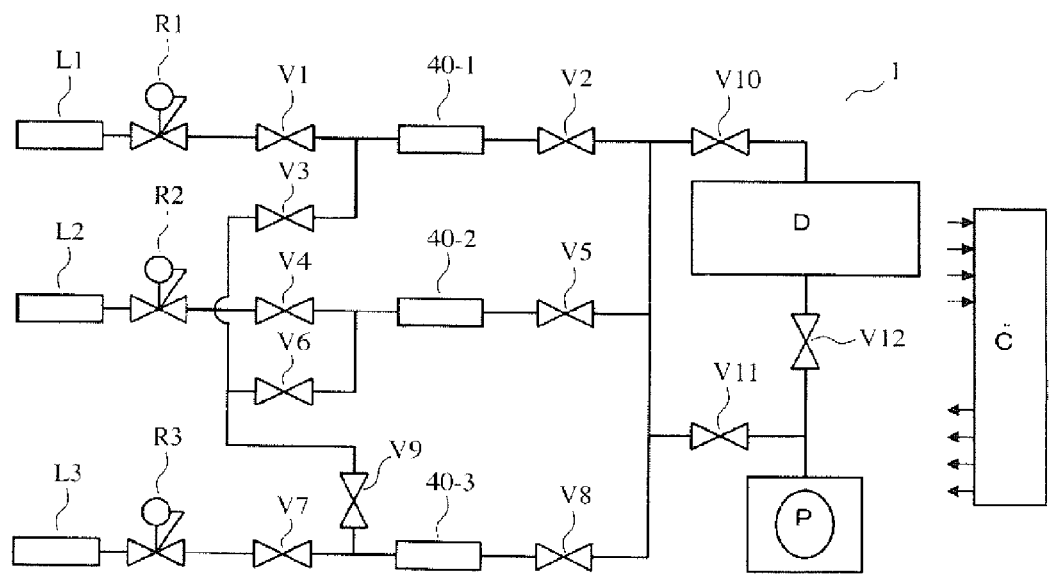
FIG. 12 is a schematic view showing one example of the semiconductor-producing apparatus of the present invention.

One example of semiconductor-producing apparatuses equipped with the mass flow controller of the present invention having a flow rate calibration function is shown in FIG. 12. Each process gas flowing from each process gas source L1 and L2 is properly pressure-adjusted by each pressure control means R1, R2, enters into each mass flow controller 40-1, 40-2 having a flow rate calibration function via an on-off valve V1, V4, so that its flow rate is controlled. It finally enters into a treatment room D via on-off valves V2, V5 and V10. The treatment room D has an outlet connected to a gas-discharging means P via an on-off valve V12. An inert gas used for substituting the process gas or for flow rate calibration flows from an inert gas source L3, properly pressure-adjusted by a pressure control means R3, enters into the mass flow controllers 40-1 and 40-2 via on-off valves V7, V9, V3, V6, so that its flow rate is controlled. The inert gas finally enters into the treatment room D via on-off valves V8 and V10.

In the operation of the semiconductor-producing apparatus, all instruction signals are output from a control means C. In an initial state, the on-off valves V1-V12 are closed. The gas-discharging means P is first operated, and the mass flow controllers 40-1, 40-2 and 40-3, and the on-off valves V2, V3, V5-V10 and V12 are opened. An inert gas (for instance, nitrogen) pressure-controlled by a pressure control means R3 is introduced into the pipe and the treatment room D. The on-off valves V3, V5, V6, V9 are then closed, and the on-off valve V1 is opened. The control means C sends a set mass flow rate signal to the mass flow controllers 40-1 and 40-3. In this state, a process gas from the process gas source L1 is pressure-controlled by the pressure control means R1, and introduced into the mass flow controller 40-1, and an inert gas from the inert gas source L3 is pressure-controlled by the pressure control means R3, and introduced into the mass flow controller 40-3, thereby introducing a process gas diluted by an inert gas into the treatment room D. The same is true of using the process gas source L2.

For instance, when the mass flow controller 40-1 is calibrated, the gas-discharging means P is operated, and the on-off valves V2, V3, V7, V9, V10, V12 are opened, such that an inert gas from the inert gas source L3 is introduced into the mass flow controller 40-1 via the pressure control means R3. A signal instructing a calibration mode is then sent to the mass flow controller 40-1. Of course, a process gas from the process gas source L1 or L2 may be used in place of the inert gas.

The percentage of good semiconductors is affected by the cleanness of a clean room and the accuracy of the flow rate control of a process gas. For instance, because dust generation greatly affects the cleanness in the operation by operators, remote control without operators is desirable. The present invention enables the examination and calibration of the flow rate control of a process gas by remote operation.

Because the entire semiconductor-producing apparatus comprising pressure control means, on-off valves, mass flow controllers, a treatment room and a gas-discharging means are controlled by the control means C alone, automatic flow rate calibration can be conducted. Also, because calibration is conducted by switching pluralities of mass flow controllers, the continuous operation of the semiconductor-producing apparatus is not hindered. Further, because the mass flow controller has a calibration function, what is needed is only to receive a signal instructing a calibration mode from the control means C, resulting in using an extremely simpler control program than those for the conventional methods.

Though the present invention has been explained referring to the depicted examples, it is not restricted thereto but may be modified within the spirit of the present invention various.

EFFECT OF THE INVENTION

Because the calibration of the mass flow controller of the present invention uses a parameter including the variations of both pressure and mass flow rate at an initial state and at calibration, it has extremely high accuracy. Also, with the mass flow controller remaining in a gas-supplying system, etc. for the semiconductor-producing apparatus, calibration can be conducted by remote control in a short period of time without stopping operation, preventing the operating rate of the semiconductor-producing apparatus, etc. from decreasing.

What is claimed is:

1. A mass flow controller having a path for flowing a fluid, comprising
    a calibrating valve disposed on the most upstream side of said path for opening or closing said path;
    a mass flow rate control valve mechanism having such a changeable degree of opening that the mass flow rate of said fluid is equal to a set mass flow rate;
    a tank provided at said path upstream of said mass flow rate control valve mechanism;
    a means for sensing the mass flow rate of said fluid to output a mass flow rate signal;
    a means for sensing the pressure of said fluid to output a pressure signal; and
    a calibration control means for carrying out mass flow rate calibration using said calibrating valve, said tank, said mass-flow-rate-sensing means and said pressure-sensing means, wherein
    said calibration control means comprises a reference data memory for memorizing the pressure and mass flow rate of said fluid in an initial state as a reference pressure and a reference mass flow rate, and a calibrating data memory for memorizing the pressure and mass flow rate of said fluid after the lapse of time as a calibrating pressure and a calibrating mass flow rate, and wherein
    a ratio of the product of a decrement of said reference pressure and a volume of said tank to an integral value of said reference mass flow rate or a difference therebetween is defined as a reference comparator Ai, and a ratio of the product of a decrement of said calibrating pressure and said tank volume to an integral value of said calibrating mass flow rate or a difference therebetween is defined as a calibrating comparator Af; and wherein a variation ratio H of Af to Ai is compared with a predetermined value for calibration.

2. The mass flow controller according to claim 1, wherein a temperature sensor is mounted to said tank to measure a temperature in said tank for the correction of said variation ratio H.

3. The mass flow controller according to claim 1, wherein said mass flow rate signal is corrected based on the calibration result.

4. A method for calibrating a mass flow controller comprising a calibrating valve disposed on the most upstream side of a path, a mass flow rate control valve mechanism, a tank provided at said path on the upstream side of said mass flow rate control valve mechanism, a mass-flow-rate-sensing means, a pressure-sensing means, a means for controlling said mass flow rate control valve mechanism, and a mass flow rate calibration control means, the method comprising the steps of (1) permitting a fluid at a set mass flow rate to flow through said path, (2) setting said mass flow rate control valve mechanism at a degree of opening that the mass flow rate of said fluid is equal to said set mass flow rate, (3) closing said calibrating valve, (4) measuring the pressure and mass flow rate of said fluid after a fluid flow from said tank is stabilized, (5) determining a variation ratio H of said pressure and mass flow rate to reference pressure and mass flow rate measured by the same procedures in an initial state by the following formula:

$$H=[1-(Af/Ai)]\times 100(\%),$$

wherein Af is a calibrating comparator represented by a ratio of the product of the decrement of said pressure and said tank volume to an integral value of said mass flow rate, or difference therebetween, and Ai is a reference comparator determined from said reference pressure and mass flow rate in the same way, and (6) performing calibration depending on said variation ratio.

5. The method for calibrating a mass flow controller according to claim 4, wherein said variation ratio H is corrected by the temperature of said fluid.

6. A method for calibrating a mass flow controller comprising a calibrating valve disposed on the most upstream side of said path, a mass flow rate control valve mechanism, a tank provided at said path upstream of said mass flow rate control valve mechanism, a mass-flow-rate-sensing means, a pressure-sensing means, a means for controlling said mass flow rate control valve mechanism, and a mass flow rate calibration control means, the method comprising the steps of (1) permitting a fluid at a set mass flow rate to flow through said path, (2) setting said mass flow rate control valve mechanism at a degree of opening that the mass flow rate of said fluid is equal to said set mass flow rate, (3) closing said calibrating valve, (4) measuring the pressure Pf and mass flow rate Rf of said fluid after a fluid flow from said tank is stabilized, (5) determining a calibrating comparator Af represented by a ratio of the product $\Delta Pf \times V$ of the decrement $\Delta Pf$ of said pressure Pf in a predetermined time period and said tank volume V to an integral value $\Sigma R$ of said mass flow rate, or a difference therebetween, (6) determining a calibrating comparator Ai represented by a ratio of the product $\Delta Pi \times V$ of pressure decrement $\Delta Pi$ in a predetermined time period and said tank volume V to an integral value $\Sigma Ri$ of the mass flow rate, or difference therebetween, from reference pressure Pi and mass flow rate Ri measured in an initial state in the same way as in said step (1)-(4), and (7) performing calibration depending on a variation ratio H represented by the formula of $H=[1-(Af/Ai)]\times 100(\%)$.

7. A semiconductor-producing apparatus comprising at least two mass flow controllers recited in claim 1, and pluralities of on-off valves, said on-off valves being operated such that the other mass flow controller can perform mass flow rate control during the calibration of one mass flow controller.

8. The mass flow controller according to claim 2, wherein said mass flow rate signal is corrected based on the calibration result.

9. A semiconductor-producing apparatus comprising at least two mass flow controllers recited in claim 2, and pluralities of on-off valves, said on-off valves being operated such that the other mass flow controller can perform mass flow rate control during the calibration of one mass flow controller.

10. A semiconductor-producing apparatus comprising at least two mass flow controllers recited in claim 3, and pluralities of on-off valves, said on-off valves being operated such that the other mass flow controller can perform mass flow rate control during the calibration of one mass flow controller.

11. A semiconductor-producing apparatus comprising at least two mass
flow controllers recited in claim 8, and pluralities of on-off valves, said on-off valves being operated such that the other mass flow controller can perform mass flow rate control during the calibration of one mass flow controller.

* * * * *